United States Patent [19]
Norman

[11] 3,750,746
[45] Aug. 7, 1973

[54] METHOD OF HEATING ADHESIVE APPLICATOR ROLL

[75] Inventor: Charles R. Norman, Willingboro, N.J.

[73] Assignee: Harris-Intertype Coporation, Cleveland, Ohio

[22] Filed: Apr. 24, 1972

[21] Appl. No.: 247,075

Related U.S. Application Data

[62] Division of Ser. No. 38,950, May 20, 1970, Pat. No. 3,706,278.

[52] U.S. Cl............ 117/111 R, 117/156, 156/210, 156/499, 156/578, 118/202
[51] Int. Cl.................. B31f 5/04, B05c 1/08
[58] Field of Search.............. 165/89, 107; 156/210, 499, 578; 117/111 R, 156; 118/202

[56] References Cited
UNITED STATES PATENTS

| | | | |
|---|---|---|---|
| 2,483,021 | 9/1949 | Oabs | 165/107 X |
| 2,824,037 | 2/1958 | King | 156/336 |
| 3,300,360 | 1/1967 | Williams | 117/156 X |
| 3,434,901 | 3/1969 | Griffiths | 156/210 |
| 3,690,981 | 9/1972 | Di Frank et al. | 156/210 |

*Primary Examiner*—Albert W. Davis, Jr.
*Attorney*—Seidel, Gonda & Goldhammer

[57] ABSTRACT

The adhesive roll of a single facer machine and/or the adhesive rolls of a glue machine at a double facer are heated to a surface temperature of between 130°F and 150°F by circulating water to heat the starch adhesive to a temperature just below its gelatinization temperature so long as the rolls are rotating.

7 Claims, 6 Drawing Figures

FIG. 6 TEMPERATURE °F

METHOD OF HEATING ADHESIVE APPLICATOR ROLL

This is a division of copending application, Ser. No. 38,950 filed May 20, 1970, now U.S. Pat. No. 3,706,298, granted December 19, 1972 and entitled "Heated Adhesive Applicator Roll System".

This invention relates to a heated adhesive roll system which is adaptable for use at a single facer corrugated paperboard machine and/or a glue machine at the double facer. Each of these machines includes an adhesive applicator roll in contact with a source of starch adhesive. For many years, it was conventional to maintain the temperature of the starch in the pan at ambient temperature or at a temperature approximately 100°F. The conventional starch adhesive gelatinizes at a temperature of approximately 145°–155°F and thereby becomes tacky so that it may act as an adhesive.

The additional heat required to increase the temperature of the adhesive while on the flute tips up to its gelatinization temperature at a single facer was normally attained by liner preheater rolls and a heated pressure roll. These rolls may heat the liner to a temperature of 200°F and higher. A double facer is normally provided with steam heated chests which provide the necessary heat to raise the temperature of the adhesive while on the flute tips up to its gelatinization temperature.

The heating of the adhesive applicator roll so as to preheat the adhesive to a temperature just below its gelatinization temperature, that is, within 20° of its gelatinization temperature, provides a significant number of advantages. At the single facer, little or no preheating of the liner is required and the high nip forces common heretofore may be substantially reduced. This excessive nip loading has resulted in pressure roll marks on the surface of the liner. The rate of production of paperboard may be substantially increased by as much as fifty percent since the adhesive need only be raised in temperature by 5° to 20° in order to effect gelatinization.

Other advantages include substantially reducing the amount of heat required at the double facer whereby the double facer may be shorter, require less steam pressure, and steam chests may be made to less stringent requirements as pertains to size and strength. Further, there is a reduced water loss by the adhesive into the paperboard. The lesser amount of water loss materially contributes to forming more uniform paperboard having a lesser tendency to exhibit warp. In addition, the rate of production of double wall and triple wall board may be increased as much as 25 percent.

The system of the present invention continuously circulates hot water through the applicator roll or rolls so long as the roll or rolls are being rotated. Water from the rolls is delivered to a surge tank. From the surge tank, the water is pumped through a heat exchanger and returned to the inlet side of the applicator rolls. The temperature of the water after it exits the heat exchanger is detected and utilized to control the inlet of steam into the heat exchanger.

The applicator rolls are preferably made with a baffle so as to direct the incoming water directly toward the inner periphery of the applicator roll. The baffle is preferably in the form of a sealed hollow member having tapered ends spaced from the I.D. of the applicator roll by webs or ribs. In this manner, the hot water cannot move in a direct line from the inlet to the outlet of the applicator rolls.

The system of the present invention is preferably constructed as a packaged unit mounted on a common support for installation as a unit on the corrugator machine bridge or other convenient support adjacent the applicator rolls.

It is an object of the present invention to provide a method of heating an adhesive applicator roll for use with a starch adhesive.

It is another object of the present invention to provide a method of circulating water through an applicator roll for maintaining the temperature of the applicator roll at a temperature so that starch adhesives thereon are just below the gelatinization temperature of the starch adhesive.

It is another object of the present invention to provide a method for heating an adhesive roll and water circulation system for attaining the advantages set forth above.

Other objects will appear hereinafter.

For the purpose of illustrating the invention, there are shown in the drawings forms which are presently preferred; it being understood, however, that this invention is not limited to the precise arrangements and instrumentalities shown.

FIG. 6 is a graph wherein the starch adhesive temperature is plotted against its viscosity in pound per feet per hour.

Figure 1:
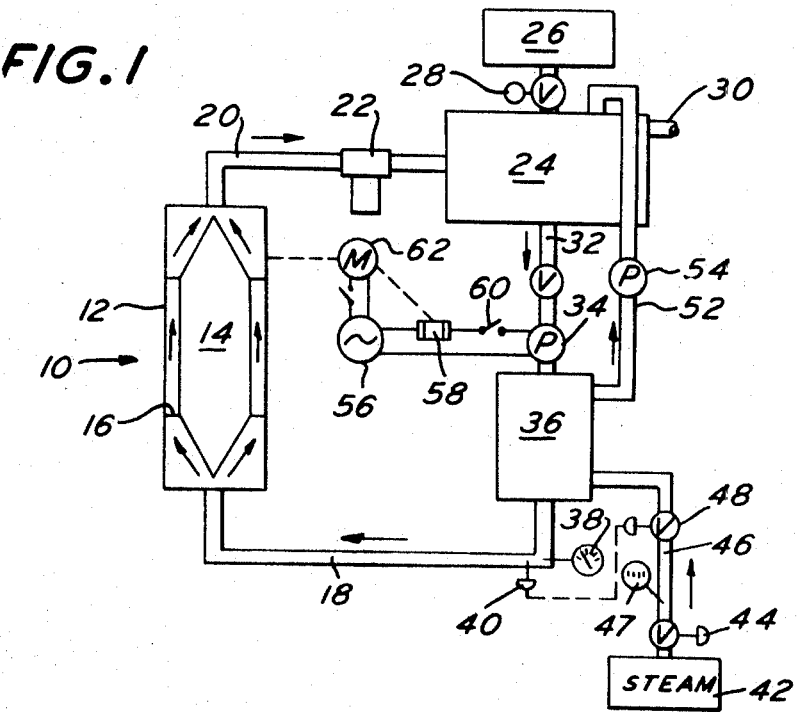
FIG. 1 is a diagrammatic illustration of the heated adhesive roll system of the present invention.

Referring to the drawing in detail, wherein like numerals indicate like elements, there is shown in FIG. 1 a heated adhesive roll system in accordance with the present invention designated generally as 10. The system 10 is particularly adapted for use in conjunction with an adhesive applicator roll 12 which may be the applicator roll of a single facer and/or glue machine. The roll 12 is provided internally with a deflector 14. Deflector 14 is preferably a sealed hollow structure having tapered ends and internally supported from the inner surface of the roll 12 by means of spaced ribs 16. Deflector 14 directs the incoming water from inlet conduit 18 along the inner peripheral surface of the applicator roll 12 so that it cannot flow on a direct line to the outlet conduit 20.

The outlet conduit 20 is provided with a strainer 22 and is connected to a surge tank 24. Surge tank 24 may be provided with a supply tank 26 connected thereby by a control valve 28. Supply tank 26 may contain a boiler compound, an antifreeze compound, or any other anticorrosive compound which may be periodically introduced into the surge tank by way of the intermittently operated valve 28. Valve 28 may be a time clock operated valve.

The surge tank 24 is provided with an overflow drain conduit 30. The outlet conduit 32 from surge tank 24 is connected to the inlet side of a pump 34 which pumps the water through a heat exchanger 36. The outlet of heat exchanger 36 is connected to one end of conduit 18.

Said one end of conduit 18 is provided with a temperature gauge 38 and a temperature sensor 40. Steam from a steam source 42 is introduced into the heat exchanger 36 by way of conduit 46. Conduit 46 is provided with an outlet pressure regulator 44 and a pilot-operated valve 48. Valve 48 is controlled by the temperature sensor 40 so that the temperature of the water in conduit 18 controls the introduction of steam into the heat exchanger 36.

The steam supply conduit 46 may be provided with a filter and a conventional pressure relief valve. Condensate collected in the heat exchanger 36 is pumped by way of conduit 52 and pump 54 to the surge tank 24. Operation of pump 54 may be controlled by the level of condensate within the heat exchanger 36 if desired.

Pump 34 is connected to a source of electrical potential 56 by way of conductors containing a relay 58 and an on-off switch 60. The relay 58 is controlled by a motor 62 which rotatably drives the applicator 12 about its longitudinal axis. So long as motor 62 is rotating the applicator roll 12, the pump 34 will remain operating so that water will be continuously circulated through the applicator roll 12. When the motor 62 stops, the pump 34 will stop unless an idler motor is provided to continue rotating the applicator roll and the pump.

When the pump 34 stops, the temperature of the water within conduit 18 will rise to the point whereby sensor 40 will shut off valve 48. If desired, steam conduit 46 may be provided with a pressure gauge 47.

Figure 2:
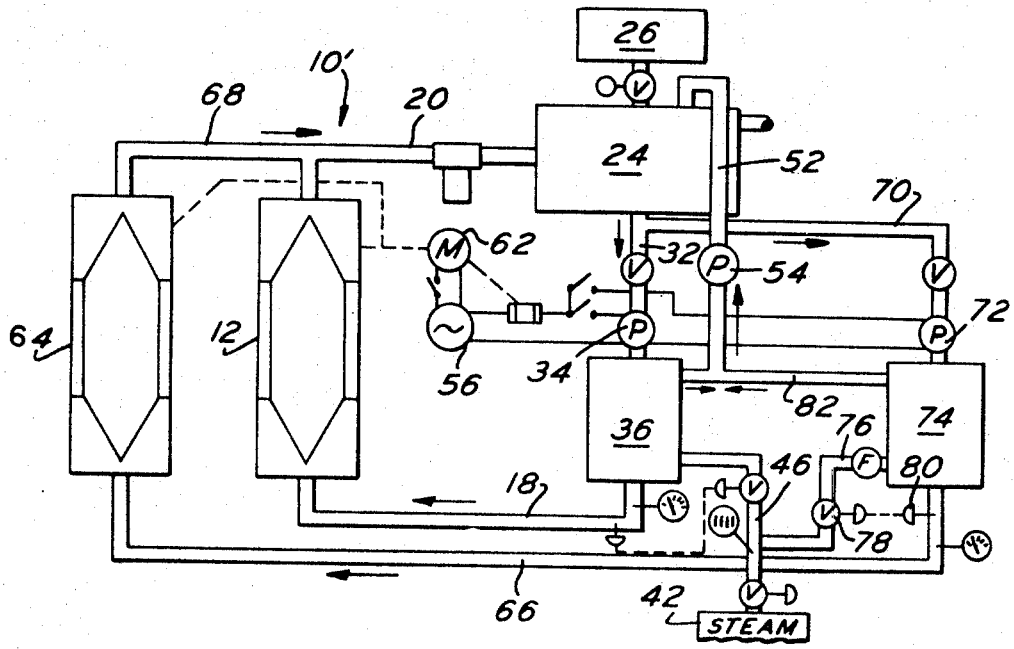
FIG. 2 is a schematic illustration of another embodiment of the system shown in FIG. 1.

In FIG. 2, there is illustrated another embodiment of the present invention designated generally as 10'. The system 10' is particularly adapted for use at a double deck glue machine of a double facer. The system 10' is the same as system 10 with the following additional structure.

An adhesive applicator roll 64 is provided parallel to roll 12. Roll 64 has an inlet conduit 66 and an outlet conduit 68. Conduit 68 is connected to conduit 20.

A branch conduit 70 extends from conduit 32 and is connected to the inlet side of a pump 72. The outlet of pump 72 is connected to the inlet side of heat exchanger 74. The outlet of heat exchanger 74 is connected to the inlet of conduit 66.

A branch conduit 76 extends from the steam supply conduit 46 to the heat exchanger 74. The temperature sensor 80 in conduit 66 controls valve 78 in conduit 76 for controlling the introduction of steam into the heat exchanger 74. A branch conduit 82 extends from the heat exchanger 74 to conduit 52 so that condensate may be pumped from heat exchanger 74 by way of pump 54 to the surge tank 24. The motor 62 is coupled to each of the rolls 12 and 64 for rotatably driving the same.

Figure 3:
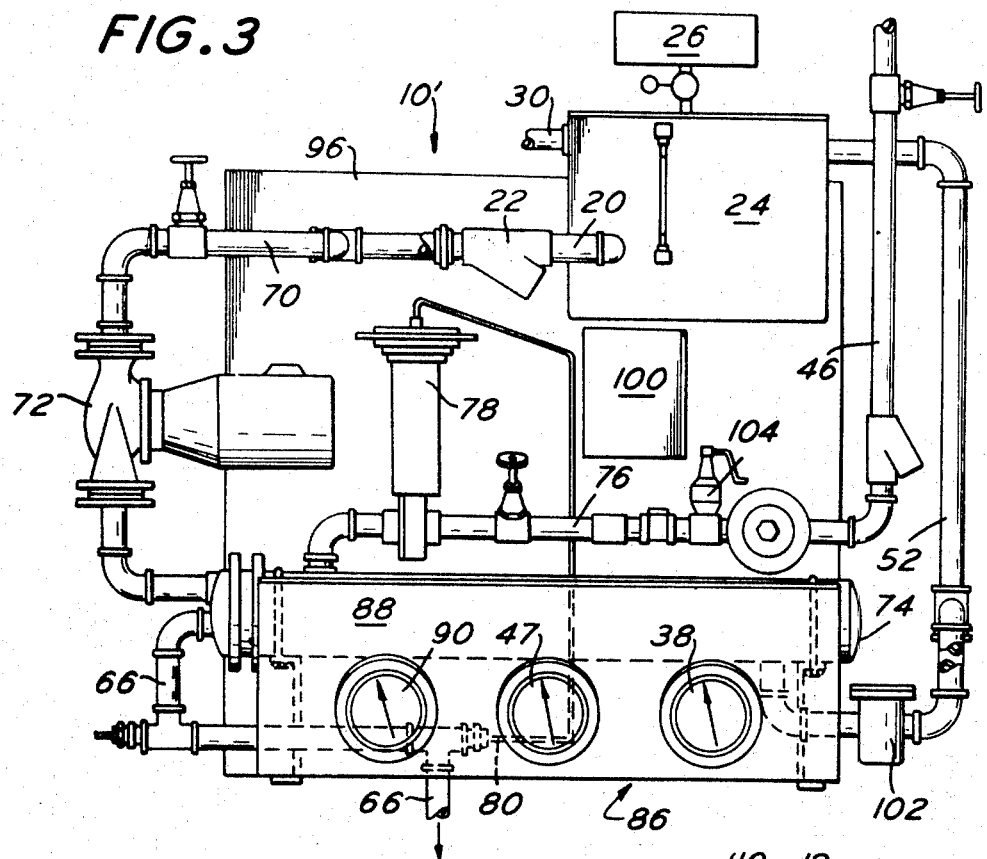
FIG. 3 is a front elevation view of the system shown in FIG. 2.
Figure 4:
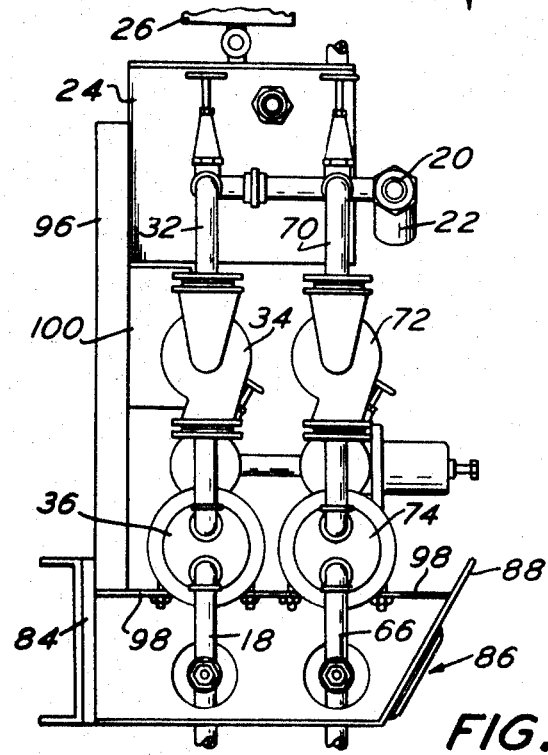
FIG. 4 is a side elevation view of the structure shown in FIG. 3 as seen from the left side.

In FIGS. 3 and 4, there is illustrated the system 10' as a packaged unit for installation on the corrugator bridge of a glue machine of a double facer. As shown more clearly in FIG. 4, a structural member 84 is provided on the bridge for attaching the packaged unit. Member 84 is connected to a troughlike frame designated generally as 86 and having an upwardly and outwardly directed front wall 88.

The front wall 88 conveniently supports the temperature gauge for the circulation of water to roll 12, the steam pressure gauge 47, and the gauge 90 which indicates the temperature of the water circulating through the roll 64. All of said gauges are positioned so that they may be read by an operator standing at floor level and looking up at the same.

The support frame includes an upright rear wall 96. The heat exchangers 36 and 74 are interconnected with the front wall 88 and rear wall 96 by spaced braces 98. An electrical supply box 100 is supported by the wall 96. As shown more clearly in FIG. 4, the parallelism of the water circulation paths diagrammatically illustrated in FIG. 2 is maintained in the packaged unit illustrated in FIGS. 3 and 4. If desired, conduit 52 may be provided with a steam trap 102 and the steam supply conduit 46 may be provided with a safety valve 104.

Figure 5:
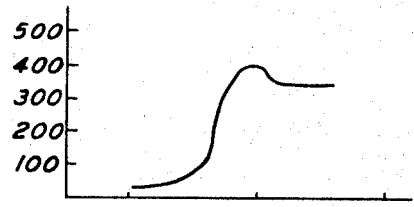
FIG. 5 is a schematic illustration of an adhesive roll in association with a glue pan.

The adhesive applicator rolls are adapted to be in contact with the adhesive which in turn is supported in a pan. This is diagrammatically illustrated in FIG. 5 and is conventional in the art. The adhesive roll 12 in FIG. 5 is in contact with the adhesive 108 supported by the pan 106. A doctor roll 110 may be utilized for cooperation with the surface of the applicator roll 12.

The surface of the doctor roll 110 is spaced from the surface of the applicator roll by a distance of 0.005 to 0.016 inches. The roll 110 is preferably hollow and chilled to a temperature of about 50° to 60°F to cause moisture to condense on its chrome-plated surface. The moisture creates a water slice which keeps the surface of the applicator roll substantially free of adhesive. Chilling of roll 110 can be accomplished by circulating tap water therethrough. The direction of rotation is shown in FIG. 5.

In FIG. 6, there is illustrated a graph of adhesive temperature versus the adhesive viscosity in pound per feet per hour. The graph is based on a typical cornstarch adhesive having a gelatinization temperature of 145°F. It will be noted that the viscosity of the adhesive is at a maximum at the gelatinization temperature. The curve indicates that up to a temperature of about 130°F, very little change in viscosity takes place. It is possible, therefore, to preheat the starch from the conventional temperature of about 100°F to an optimum temperature of about 5° F below its gelatinization temperature. Thereafter, while the adhesive is on the flute tips, it need only be increased in temperature five degrees in order to effect gelatinization and a resultant bond.

Depending upon the material from which the applicator rolls are made, it may be desirable to provide the inner surface of the applicator rolls with an anticorrosive coating such as a bronze coating, chrome plating, a galvanized surface, etc. The system of the present invention may be applied to applicator rolls in the field on existing machinery except for the baffle 14 which must be assembled within a new applicator roll as the roll is being constructed.

It will be noted that the water circulation system is a closed system wherein the water is continuously used. The use of a surge chamber eliminates pressurization of the system which could cause air pockets or other high pressure problems with the circulation system such as reduction of heat transfer through the applicator roll.

In each of the systems 10 and 10', the pump or pumps are operative so long as the applicator rolls 12 and/or 64 are being rotated. This arrangement prevents the rolls from being subjected to uneven heat expansion with subsequent out-of-roundness which can occur if the hot water circulates through stationary rolls. In system 10', the motor for rotating the rolls is electrically coupled to the double facer or glue machine idling motor for simultaneous operation.

The present invention may be embodied in other specific forms without departing from the spirit or essential attributes thereof and, accordingly, reference should be made to the appended claims, rather than to the foregoing specification as indicating the scope of the invention.

I claim:

1. A method of controlling the surface temperature of a starch adhesive bonding agent applicator roll of a corrugator machine comprising the steps of applying a starch adhesive bonding agent to paperboard by a hollow applicator roll, rotating said roll about its longitudinal axis, pumping water from a tank through said roll and returning the water to said tank, heating the water before it enters the roll, heating said roll by contact with said heated water passing through said roll so that the temperature of the starch adhesive bonding agent thereon is at a temperature of 5-15°F below its gelatinization temperature, and controlling said step of heating the water by detecting the temperature of the water.

2. A method in accordance with claim 1 including keeping the applicator roll substantially free of said adhesive bonding agent by means of a doctor roll adjacent thereto, and chilling the doctor roll to cause moisture to form on the surface thereof while the doctor roll is rotating.

3. A method in accordance with claim 1 wherein said step of heating said roll causes the starch adhesive bonding agent to be at a temperature of between about 130° and 145°F.

4. A method in accordance with claim 1 including the step of reheating any water which has passed through said roll, and recirculating such reheated water through the roll.

5. A method in accordance with claim 1 wherein said step of heating the water includes using steam to raise the temperature of the water.

6. A method of controlling the surface temperature of an adhesive applicator roll of a corrugator machine comprising the steps of applying a starch adhesive to paperboard by a hollow applicator roll, rotating said roll about its longitudinal axis, pumping water from a surge tank through said roll and returning the water to said tank, heating the water before it enters the roll by a steam heat exchanger, heating the surface temperature of said roll to a temperature of 5-15°F below the gelatinization temperature of said adhesive by contact with said heated water passing through said roll, controlling the introduction of steam into the heat exchanger in response to the temperature of the water between the heat exchanger and said roll, and ceasing said step of pumping water when said roll ceases to rotate.

7. A method in accordance with claim 6 including keeping the adhesive applicator roll substantially free of adhesive by means of a doctor roll adjacent thereto, and chilling the doctor roll to cause moisture to form on the surface thereof.

* * * * *